Patented Mar. 20, 1934

1,952,029

UNITED STATES PATENT OFFICE 1,952,029

PROCESS FOR MANUFACTURING SULPHUR DYESTUFFS

Georg Kalischer, Frankfort-on-the-Main, and Heinrich Ritter, Frankfort-on-the-Main-Fechenheim, Germany, assignors to General Aniline Works, Inc., New York, N. Y., a corporation of Delaware No Drawing. Continuation of application Serial No. 328,058, filed December 22, 1928. This application March 13, 1931, Serial No. 522,512. In Germany December 27, 1927

3 Claims. (Cl. 260—19)

This application is a continuation of our application Serial No. 328,058, filed December 22, 1928.

It is well known that the production of sulphur dyestuffs derived from indophenols or leucoindophenols needs frequently an exceedingly long boiling with aqueous or alcoholic polysulphide solutions for obtaining useful dyestuffs and for reaching the maximum of dyestuff formation.

Now we have found a new improved method for abbreviating essentially the duration of the sulphuration process when adding to the reaction mass an oxidizing agent at a suitable moment which depends as we have found on the character of the starting material used and on the sulphurizing agent applied. As oxidizing agents besides air particularly nitrocompounds of the formula $XNO_2$, wherein X means an organic radical or a metal, such as nitrobenzene, nitrophenol, ethylnitrite and as inorganic oxidizing agents with the same effect alkali nitrites are suitable. The most effective quantity of the oxidizing agent as well as the most favorable moment of adding the oxidizing agent may be advantageously ascertained by previous tests.

The especial technical effect of our improved process consists in the fact, that the formation of the dyestuffs is essentially accelerated, and in the further fact, that the leucocompounds of sulphur dyestuffs formed as primary reaction products are immediately converted into the dyestuffs themselves, whereas this important endphase according to the usual process is only obtained by a long heating of the reaction mass.

As a consequence of these facts the dyestuffs obtained according to our process are distinguished by a better solubility and a very pure shade compared with the products obtained according to the usual process of sulphuration.

When combining our present process with the step of using hydroaromatic hydroxycompounds as solvents for the sulphuration process as described in our U. S. Patent No. 1,759,261, filed June 26, 1928, especially favorable results are obtained.

In order to further illustrate our invention the following examples are given, the parts being by weight and all temperatures in centigrade degrees; but we wish it however to be understood that our invention is not limited to the examples given, nor to the exact conditions stated therein.

Example 1

100 parts of sodium sulphide of 60% strength, 150 parts of sulphur and about 225 parts of butyl-alcohol are boiled in an apparatus provided with a reflux condenser in order to form the polysulphide. Then to this solution 100 parts of 3-(4'-hydroxyphenyl)-aminocarbazol are added and the mixture is boiled for about 8 hours. Then for about 2 hours air is blown in, then the mass is diluted with about 500 parts of water and slightly acidulated. The butyl-alcohol is removed by steam distillation and the precipitated dyestuff is filtered off. For removing some adhering sulphur the moist filter-good may be treated with a dilute sodium sulphide solution or when previously dried the residue may be extracted with suitable solvents such as carbon disulphide. The dyestuff thus obtained corresponds in its properties with the dyestuff described in U. S. Patent 956,348. The yield is substantially increased compared with the process carried out in the same manner but without blowing in air.

Example 2

100 parts of sodium sulphide of 60% strength, 150 parts of sulphur and about 400 parts of alcohol of 95% strength are boiled in an apparatus provided with a reflux condenser in order to form the polysulphide. Then to this solution 100 parts of 3-(4'-hydroxyphenyl)-aminocarbazol are added and the mass is boiled for about 45-50 hours. Then 7.5 parts of dry sodium nitrite are added, whereby from the brown liquor while violently boiling up shortly the dyestuff separates entirely as a dark blue mass. The alcohol is distilled off, the residue is diluted with water and filtered off. For removing some adhering sulphur the moist filter-good may be treated with a dilute sodium sulphide solution or when previously dried the residue may be extracted with suitable solvents such as carbon disulphide. The dyestuff thus obtained in an especially good yield and purity corresponds in its properties with the dyestuff described in U. S. Patent No. 956,348.

Example 3

To a solution of 80 parts of sodium sulphide of 60% strength and 160 parts of sulphur in about 400 parts of alcohol 100 parts of 3-(4'-hydroxyphenyl)-amino-9-ethyl-carbazol are added and the mixture is heated to boiling for about 40 hours in an apparatus provided with a reflux condenser. Then a solution of 10 parts of sodium nitrite in about 100 parts of water is added, whereby the dyestuff separates from the brown liquor. It is isolated in the manner described in Example 1. The dyestuff thus obtained is identical in its general properties with the dyestuff of U. S. Patent No. 966,092 but it is superior as to its tinctorial intensity.

*Example 4*

A mixture of 100 parts of crystallized sodium sulphide, 200 parts of water and 40 parts of sulphur is mixed with 22.5 parts of 4-amino-3-methyl-4'-hydroxy-diphenylamine and the whole is heated to boiling for about 20 hours at about 105–110° in an apparatus provided with a reflux condenser. After addition of a solution of 2 parts of sodium nitrite in about 20 parts of water, heating is continued for about 2 hours, whereby the dyestuff separates as a compact mass. Then the mass is diluted with about the tenfold quantity of water and the dyestuff is precipitated in the usual manner by means of dilute acid or by introducing a stream of air. The dyestuff thus produced is substantially identical with that of U. S. Patent No. 709,151. For obtaining the dyestuff with the same intensity and yield, when working without the addition of nitrite, one needs an essentially longer duration of boiling.

*Example 5*

25 parts of sodium sulphide of 60% strength, 30 parts of sulphur and 200 parts of methyl-cyclohexanol are heated at 110–120° while stirring. Then during about a quarter of an hour 25 parts of 4-hydroxy-diphenylamine are introduced and the mass is heated in an apparatus provided with a descending condenser, until the water has been entirely distilled off, and then for about further 3 hours while using a reflux condenser. The mass is cooled down to about 110–120° and a mixture of 4 parts of nitrobenzene and 20 parts of methyl-cyclohexanol is added. After heating for a short time it is diluted with water, feebly acidulated and the methyl-cyclohexanol is expelled by steam. Then the dyestuff is filtered off and dried. It is identical with the dyestuff obtained according to U. S. application Serial No. 726,121 (cf. U. S. Patent 1,098,259). Also in this case the addition of nitrite increases the yield and the tinctorial power and causes an essential abbreviation of the duration of the process.

*Example 6*

25 parts of sodium sulphide of 60% strength, 30 parts of sulphur and 120 parts of methyl-cyclo-hexanol are heated while stirring to about 120° until a complete solution occurs. Then quickly 20 parts of 4-phenylamino-4'-hydroxy-diphenylamine are added and the mixture is at first heated in an apparatus provided with a descending condenser until the water contained in the mass is distilled off, and then heating is continued for about an hour at about 160°. Then the mass is cooled down to about 110° and 2½ parts of nitrobenzene are added, whereby the dyestuff quickly separates from the brown solution. After dilution with cold water the methyl-cyclo-hexanol is expelled by steam and the dyestuff is isolated in the usual manner by acidulating the mass or by means of a stream of air. The dyestuff thus formed is identical with that of U. S. Patent 723,154, but it is obtained according to our present process in a better yield, being also superior as to the solubility.

We wish it to be understood that in the following claims the term "indophenol compounds" includes the indophenols and their leuco compounds.

We claim:

1. An improved process which comprises adding during the process of sulphuration of a para-aminophenol derivative an oxidizing agent of the group consisting of air and nitro compounds to the sulphuration mass comprising an indophenol compound and an alkali metal polysulphide.

2. An improved process which comprises adding during the process of sulphuration of a para-aminophenol derivative an oxidizing agent of the general formula:

$$XNO_2,$$

wherein X means a monovalent metal or monovalent hydrocarbon radical, to the sulphuration mass comprising an indophenol compound and an alkali metal polysulphide.

3. An improved process which comprises adding during the process of sulphuration of a para-aminophenol derivative an alkali nitrite to the sulphuration mass comprising an indophenol compound and an alkali metal polysulphide.

GEORG KALISCHER.
HEINRICH RITTER.